United States Patent
Aoyama et al.

(10) Patent No.: US 7,934,996 B2
(45) Date of Patent: May 3, 2011

(54) ONLINE VIDEO GAME CONTROL SERVER AND A METHOD OF CONTROLLING AN ONLINE VIDEO GAME

(75) Inventors: Koji Aoyama, Tokyo (JP); Tomoaki Murata, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 960 days.

(21) Appl. No.: 11/773,685

(22) Filed: Jul. 5, 2007

(65) Prior Publication Data

US 2008/0009352 A1 Jan. 10, 2008

(30) Foreign Application Priority Data

Jul. 6, 2006 (JP) ................................. 2006-187142

(51) Int. Cl.
- *A63F 13/00* (2006.01)
- *A63F 9/24* (2006.01)
- *G06F 17/00* (2006.01)
- *A63F 13/10* (2006.01)

(52) U.S. Cl. ..................... 463/42; 463/4; 463/5; 463/34; 463/43; 273/108.1; 273/317.1; 345/473; 715/706; 715/757; 715/764

(58) Field of Classification Search .................. 463/1–5, 463/7–9, 30–34, 36–39, 40–43, 49–57; 273/108.1, 273/127 R, 148 R, 148 B, 309, 317.1, 340, 273/348, 361–367; 345/1.1–3.4, 156, 157, 345/160, 419, 473–475, 618–619, 629; 717/168–178; 348/37, 119, 141–142, 240.99, 348/E13.022–E13.027, E13.036; 434/115, 434/117, 118, 211; 715/706, 738, 757, 762–764; *A63F 13/00, 13/10, 9/24; G06F 17/00*

See application file for complete search history.

(56) References Cited

U.S. PATENT DOCUMENTS

4,633,436 A * 12/1986 Flurry ........................... 345/179

(Continued)

FOREIGN PATENT DOCUMENTS

EP 0990461 4/2000

(Continued)

OTHER PUBLICATIONS

"Ultima X Odyssey," Weekly Famitsu, the Jan. 16 issue extra number, Famitsu NetGames, vol. 7, Enterbrain Inc., Japan, Jan. 16, 2004, pp. 94-97, together with an English language partial translation thereof.

(Continued)

*Primary Examiner* — Arthur O. Hall

(74) *Attorney, Agent, or Firm* — Greenblum & Bernstein, P.L.C.

(57) ABSTRACT

An online video game controlling server includes an online game information storage database for storing game information on an online video game that includes player information on player characters and area information on a game area of the online video game, and a control section for controlling the progress of the video game on the basis of the game information. A shared area and an unshared area are provided in the game area of the online video game. When one player character moves to the unshared area, the control section creates instance information including area specifying information, character identification information and instance creating necessary object information. In addition, the control section server breaks communication between the one player character and the other belonging player character to update the instance information whenever the progress state of the instance creating necessary object changes due to the action of the one player character.

11 Claims, 8 Drawing Sheets

U.S. PATENT DOCUMENTS

| | | | |
|---|---|---|---|
| 5,107,443 A * | 4/1992 | Smith et al. | 715/751 |
| 5,265,888 A * | 11/1993 | Yamamoto et al. | 463/10 |
| 5,602,570 A * | 2/1997 | Capps et al. | 345/173 |
| 5,610,665 A | 3/1997 | Berman | 348/564 |
| 5,926,179 A * | 7/1999 | Matsuda et al. | 715/752 |
| 6,057,856 A * | 5/2000 | Miyashita et al. | 345/633 |
| 6,241,609 B1 * | 6/2001 | Rutgers | 463/31 |
| 6,577,306 B2 * | 6/2003 | Matsuda | 345/419 |
| 6,730,862 B1 * | 5/2004 | Gasparik | 178/18.01 |
| 6,972,757 B2 * | 12/2005 | Arikawa et al. | 345/419 |
| 7,336,276 B2 * | 2/2008 | Ishihata et al. | 345/426 |
| 7,775,867 B2 * | 8/2010 | Eto et al. | 463/9 |
| 7,794,315 B2 * | 9/2010 | Sakaguchi et al. | 463/9 |
| 7,833,096 B2 * | 11/2010 | Sakaguchi et al. | 463/31 |
| 2002/0098885 A1 * | 7/2002 | Sakaguchi | 463/31 |
| 2002/0098890 A1 * | 7/2002 | Sakaguchi | 463/42 |
| 2002/0118186 A1 | 8/2002 | Matsuda | |
| 2004/0143852 A1 * | 7/2004 | Meyers | 725/133 |
| 2005/0187023 A1 * | 8/2005 | Miyamoto et al. | 463/43 |
| 2005/0212817 A1 * | 9/2005 | Cannon et al. | 345/619 |
| 2006/0073863 A1 * | 4/2006 | Hagiwara | 463/9 |
| 2006/0154713 A1 | 7/2006 | Sunazuka et al. | |
| 2007/0060342 A1 * | 3/2007 | Sakaguchi et al. | 463/31 |
| 2007/0060343 A1 * | 3/2007 | Sakaguchi et al. | 463/31 |

FOREIGN PATENT DOCUMENTS

| | | |
|---|---|---|
| EP | 1541209 | 6/2005 |
| JP | 2001 232068 | 8/2001 |
| JP | 2002 183762 | 6/2002 |
| JP | 2003-190642 | 7/2003 |
| JP | 2004 298373 | 10/2004 |
| WO | 2007/032364 | 3/2007 |

OTHER PUBLICATIONS

English language Abstract of JP 2003-190642.

Weekly Famitsu the Oct. 31 issue extra number, Famitsu NetGames, vol. 6, Enterbrain Inc., Japan, Oct. 31, 2003, pp. 44-47, the article of "Ultima X odyssey."

LOGiN the October issue, Enterbrain Inc., Japan, Oct. 1, 2003, vol. 22/Issue No. 10/Serial No. 331, pp. 71-85, the article of "Ultima X odyssey."

English language Abstract of JP 2001-232068.

English language Abstract of JP 2002-183762.

English language Abstract of JP 2004-298373.

* cited by examiner

| OBJECT ID | INSTANCE ID | DETAILED INFORMATION | | |
| --- | --- | --- | --- | --- |
| | | POSITIONAL INFORMATION | STATUS | ... |
| PC1234 | S001 | ... | HP98/100 | ... |
| PC4567 | P001 | ... | HP30/80 | ... |
| PC5678 | P001 | ... | STATE OF APPARENT DEATH | ... |
| PC7890 | P001 | ... | HP55/150 | ... |
| PC1111 | S002 | ... | HP200/200 | ... |
| DR001-S001 | S001 | ... | Close | ... |
| DR001-P001 | P001 | ... | Open | ... |
| DR001-S002 | S002 | ... | Open | ... |
| MONS001-S001 | S001 | ... | Hp400/500 | ... |
| MONS001-P001 | P001 | ... | HP10/500 | ... |
| MONS001-S002 | S002 | ... | DEATH | ... |

SCREEN IMAGE WHEN VIEWED FROM PLAYER OPERATING PCa

FIG.8

ONLINE VIDEO GAME CONTROL SERVER AND A METHOD OF CONTROLLING AN ONLINE VIDEO GAME

CROSS-REFERENCE TO RELATED APPLICATION

The present disclosure relates to subject matter contained in Japanese Patent Application No. 2006-187142, filed on Jul. 6, 2006, the disclosure of which is expressly incorporated herein by reference in its entirety.

BACKGROUND OF THE INVENTION

1. Field of the Invention

The present invention relates to a technique for controlling progress of a video game played on a player terminal, which a player operates, via a communication network.

2. Description of the Related Art

Heretofore, various kinds of so-called online games are presented. Such an online game is supplied to a player terminal via a communication network such as the Internet. Further, in a role playing game as the online game (RPG; that is, a game in which a player plays a role of a character in a world of the game, and accomplishes a predetermined object while enjoying a process that the character grows through various experiences), a plurality of players may respectively operate a plurality of player characters, and the plurality of player characters may appear in the same field of a virtual world on the game at the same time. In this case, the plurality of players can experience the same event at the same time.

This online game allows the player characters existing in the topographically near place on the same field to view the other player characters mutually. In addition, the online game allows the player characters to make contact with the other player character such as make a conversation on the field. One specific interest in the online game is that other player characters operated by other players appear on the same field in this manner and the game proceeds together.

On the other hand, other player character operated by a third person who is unrelated to oneself however may strike down a boss character in a battle scene with the boss character, for example. This result in remarkable harm in interest in the game for the player who wants to strike down the boss character by himself.

Moreover, for example, in the case where a virtual world on the game has broken by the player character operated by any player, this results in influence on all of the other players who respectively operate other player characters existing in the same virtual world.

In order to prevent harmful influence as described above, the online game is devised so that all of the players can experience an important event by shutting the sharing of the game world from the other players at timing of encountering an important scene (such as confrontation with the boss character), and setting an area called a "private area" for every player or party.

This private area is accomplished by creating the same number of instances (copies) as that of players (or parties) dynamically. The instance includes map data required for a specific area when the player character moves in the specific area on the game world, and data on an enemy character and the like.

Thus, there has been a problem that processing load of an online game providing server for providing the online game is increased when a large number of players access an area or event that is an object to create a private area at the same time.

In order to reduce the load of the online game, various technologies are proposed for games in which a story is developed in high-load form against the server (in particular, a massively multiplayer online role playing game (MMORPG)).

For example, Japanese Patent Application Publication No. 2001-232068 discloses that the load of a server is reduced by executing communication for only important information such as acquirement and/or exchange of item(s) and attack against an enemy character and not executing communication for data other than the important information (such as movement of a player character).

Further, Japanese Patent Application Publication No. 2002-183762 discloses that the load of a server is reduced by setting the upper limit of the number of player characters to be displayed on a screen, and not reflecting (that is, not executing communication) data on excess player characters even though the number of player characters existing in the same area exceeds the upper limit.

Moreover, Japanese Patent Application Publication No. 2004-298373 discloses that the load of a server is reduced by determining congestion degree of an area on the basis of the amount of data for sending and receiving chats, and gradually increasing or decreasing a communicatable area in response to the determined congestion degree.

However, in the private area of the prior art described above, an instance about all of the data used in the area is created for each of the players (or parties). Thus, there is a problem that a server resource of the control for the private area is increased in proportion to the number of players (or parties).

Further, the load of the server is somewhat reduced using the technique disclosed in the Japanese Patent Application Publications described above. However, since the processing load of the server for providing an online game is still great amount, it is expected to reduce the load further.

SUMMARY OF THE INVENTION

It is one object of the present invention to solve the problems described above and to provide an online video game control server and a method of controlling an online video game capable of realizing a non-shared area equivalent to a private area in which the increasing amount of a server resource is suppressed, and reducing the processing load of a server apparatus for providing an online game as much as possible.

In order to achieve the above object, one aspect of the present invention is directed to an online video game control server for controlling progress of a video game via a communication network. In this case, the video game is played in a player terminal to be operated by a player. The online video game control server of the present invention includes a game information storage database for storing game information on the video game, the game information being utilized to control the progress of the video game, the game information including player information on player characters and area information on a game area of the video game, the player information including player character progress information capable of specifying a stage of progress of the video game for each of the player characters, a shared area and an unshared area being provided in the game area, in the shared area both one player character whose action is controlled by operations from the player terminal and other player characters whose actions are respectively controlled by operations from other player terminals than the player terminal being allowed to exist together and the video game being capable of proceeding while the one player character and the other player characters share various kinds of data (such as character data, event data, mapping data and the like) on the shared area. In the unshared area the video game proceeding for the one player character independently while the one player character and other belonging player characters cannot share any information, the other belonging player characters being player characters other than the one player character and the other player character belonging to a party to which the one player character belongs.

The online video game control server also includes a control section for controlling the progress of the video game on the basis of the game information.

In this case, when the one player character moves to the unshared area, the control section creates instance information including area specifying information capable of specifying the unshared area, character identification information capable of identifying the one player character and instance creating necessary object information used to supply an instance creating necessary object that the one player character cannot share with the other belonging player characters in the process that the one player character moves in the unshared area, and breaks communication between the one player character and the other belonging player character.

Further, the control section updates the instance information whenever the state of the instance creating necessary object changes due to the action of the one player character.

Since the online video game control server may have the configuration described above, it is possible to realize a non-shared area equivalent to a private area in the state where the increasing amount of a server resource is suppressed, and this makes it possible to reduce the processing load of a server apparatus for providing an online game as much as possible.

It is preferable that the control section erases the instance information for the one player character when the one player character moves from the unshared area to the shared area.

It is preferable that the instance creating necessary object information is object data that the one player character cannot share with the other player character, and includes specific non-player character data.

Further, in another aspect of the present invention, the present invention is directed to an online video game controlling method of controlling progress of a video game via a communication network. In this case, the video game is played in a player terminal to be operated by a player. The online video game controlling method of the present invention includes executing a control process for controlling the progress of the video game on the basis of game information on the video game stored in a game information storage database, the game information being utilized to control the progress of the video game, the game information including player information on player characters and area information on a game area of the video game, the player information including player character progress information capable of specifying a stage of progress of the video game for each of the player characters, a shared area and an unshared area being provided in the game area, in the shared area both one player character whose action is controlled by operations from the player terminal and other player characters whose actions are respectively controlled by operations from other player terminals than the player terminal being allowed to exist together and the video game being capable of proceeding while the one player character and the other player characters share various kinds of data on the shared area, in the unshared area the video game proceeding for the one player character independently while the one player character and other belonging player characters cannot share any information, the other belonging player characters being player characters other than the one player character and the other player character belonging to a party to which the one player character belongs.

In the online video game controlling method, the control process includes when the one player character moves to the unshared area, creating instance information including area specifying information capable of specifying the unshared area, character identification information capable of identifying the one player character and instance creating necessary object information used to supply an instance creating necessary object that the one player character cannot share with the other belonging player characters in the process that the one player character moves in the unshared area, and breaking communication between the one player character and the other belonging player character.

Further, the control process also includes updating the instance information whenever the state of the instance creating necessary object changes due to the action of the one player character.

According to the present invention, it is possible to realize a non-shared area equivalent to a private area in the state where the increasing amount of a server resource is suppressed, and this makes it possible to reduce the processing load of a server apparatus for providing an online game as much as possible.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

DETAILED DESCRIPTION OF THE INVENTION

Preferred embodiments of an online video game control server and a method of controlling an online video game according to the present invention will now be described in detail with reference to the appending drawings.

Figure 1:
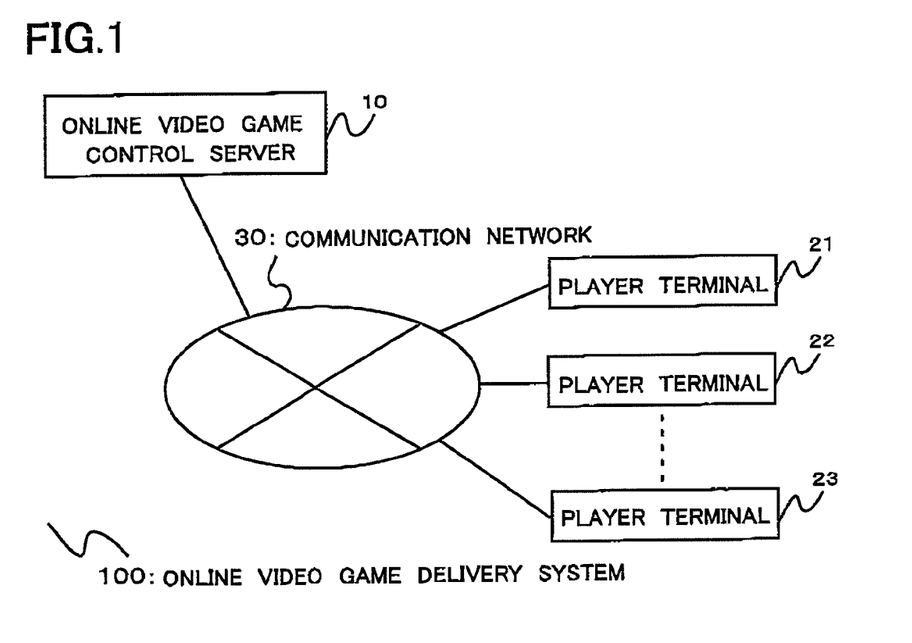
FIG. 1 is a block diagram that illustrates an example of a configuration of an online video game delivery system.

FIG. 1 is a block diagram that illustrates an example of a configuration of an online video game delivery system 100 including an online video game control server 10 according to one embodiment of the present invention. As shown in FIG. 1, the online video game delivery system 100 includes the online video game control server 10 and a plurality of player terminals 21 to 2N ("N" is an arbitrary positive Integer).

Each of the online video game control server 10 and the plurality of player terminals 21 to 2N is connected to a communication network 30 such as the Internet.

The online video game control server 10 is managed by a system manager (or administrator) of the online video game delivery system 100. The online video game server 10 has various functions for providing (or delivering) an online video game for each of the player terminals 21 to 2N. The online video game control server 10 is constituted from an information processing apparatus such as a WWW server.

The player terminals 21 to 2N are respectively managed by players of the online video game. Each of the player terminals 21 to 2N is constituted from an information processing apparatus such as a commercial video game device and potable information terminal, for example. Each of the player terminals 21 to 2N includes hardware and software for connecting itself to the communication network 30. Each of the player terminals 21 to 2N includes a display device inside or outside the player terminal itself. The display device has an image display screen constituted from a television apparatus or a liquid crystal display.

Figure 2:
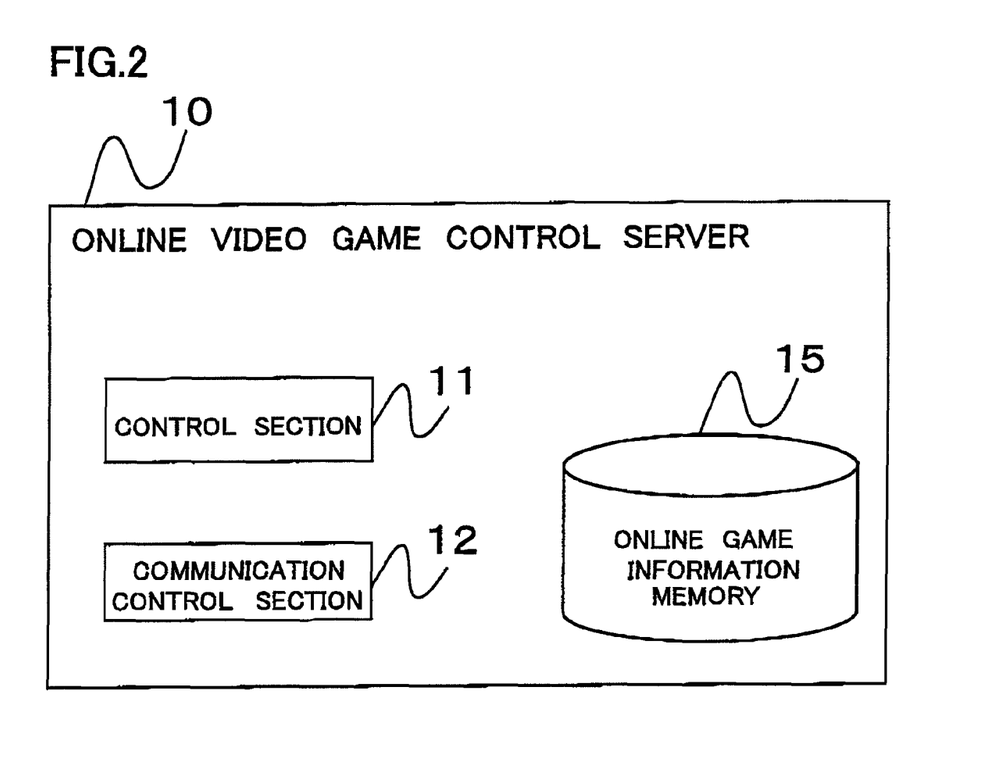
FIG. 2 is a block diagram that illustrates an example of a configuration of an online video game control server.

FIG. 2 is a block diagram that illustrates an example of a configuration of the online video game control server 10. As shown in FIG. 2, the online video game control server 10 includes a control section 11, a communication control section 12, and an online game information memory 15.

The control section 11 executes control processes of the whole online video game control server 10 in accordance with control programs stored in the online game information memory 15.

The communication control section 12 has a function to execute communication between the player terminals 21 to 2N, for example, via the communication network 20 such as the Internet.

The control section 11 executes various processes such as a process for updating online game information (will be described later). Further, the control section 11 has a function to execute various processes such as a process for creating instance information and a process for updating the created instance information.

The "instance information" is information that is copied for a specific object in response to the number of player characters or parties when a player character (or a party including a plurality of player characters) is moved to a non-shared area (will be described later). The "instance information" means information that cannot be shared with other belonging player character in various kinds of inarea usage data used in the non-shared area (such as character data, event data, and mapping data). The "other belonging player character" is a player character that belongs to other team or party other than oneself (or my player character) regardless of the form such as individual or a party. More specifically, the "other belonging player character" is other player character except for oneself and other player characters that belong to the party to which the player character oneself (hereinafter, also referred to as "one player character" or "my player character") belongs.

In the present embodiment, the "instance information" includes event information on an event in a non-shared area and clear necessary event information that indicates information for providing an event required (or necessary) to be terminated to clear the non-shared area among enemy character information on an enemy character that appears in the non-shared area.

In this regard, the "clear necessary event" includes an event that a player character strikes down a boss character of the non-shared area (it means that the boss character becomes a battle impossible state. More specifically, an HP that is a life point of the boss character is caused to become zero) and an event that the player character experiences an event required to clear the video game (for example, an encounter with an important character (such as a princess who is confined), a discovery of an important item, and the like). In the case of the former, a condition to clear the non-shared area is to strike down the boss character. In the case of the latter, a condition to clear the non-shared area is to find out the princess or to obtain the item.

Further, in the "instance information", in the case where a door or a gate is provided, for example, even though it is not a condition to clear the non-shared area as described above, object data has to be prepared for every player character or party. This is because, for example, with respect to open and/or close of a door, the door is displayed so as to be suddenly opened nevertheless the player operating the one player character cannot view appearance of other belonging player character in the case where the other belonging player character executes an action to open the door. For this reason, object data influenced due to an action of the other belonging player character as described above is also included in the "instance information".

The online game information memory 15 is constructed from a database apparatus, for example. Various kinds of data such as online game information (will be described later) and control programs for the online video game are stored in the online game information memory 15, which is a storage media.

In this regard, the online video game according to the present embodiment is an RPG including a portion in which the online video game proceeds when a plurality of characters, including a player character (that is, a character that moves in accordance with operations of a keypad by a player), moves on a field provided in a virtual three-dimensional space. Further, the virtual three-dimensional space in which the field is formed is indicated by coordinates of the world coordinate system.

Moreover, the online video game according to the present embodiment has a shared area and a non-shared area as a game area provided in the online video game. One player character (or a party including the one player character) is allowed to exist together with other player character(S) in the "shared area" of the game area provided in the online video game. The "shared area" means an area in which the one player character or the party can advance the online video game while sharing information with other player characters (or other party). On the other hand, the "non-shared area" means an area in which the one player character (or the party including the one player character) is required to advance the online video game independently without sharing any information with other player character(s) (that is, without existing together with other player character(s) in the "non-shared area") In the online video game according to this embodiment, when a player character completes all of clear necessary events prepared in a "non-shared area" by moving in the "non-shared area", the online video game proceeds to a next game area.

Here, the online game information will now be described.

The online game information includes player information indicating a progress status and the like of each of players and area information indicating information on a shared area and a non-shared area.

The player information includes player character progress information in which a player ID corresponds to game progress information. The player ID is supplied to each of players in order to identify at least a player or a player character of the player uniquely. The player character progress information is utilized to specify a name of a player (for example, handle name), an IP address of a player terminal that the player operates, a player character ID supplied to each player character that the player operates, a name of a player character that the player operates, progress of the online video game of the player character. Various kinds of information, such as existence area information indicating whether or not the corresponding player character exists in the area at the present time, status data including the level of the player character, and possessing item data, are included in the player character progress information.

The area information includes an area ID for uniquely identifying each game area, area classification information indicating whether classification of the area is a shared area or a non-shared area, existence player character information for specifying any player character existing in the corresponding area, object information indicating objects such as a non-player character (including enemy characters) and an item in the online video game, instance information created, if needed, for each player character (or each party), common information that can be shared by player characters existing in the area without creating an instance even in a non-shared area, map information indicating a map of the corresponding area, sound information indicating sounds used in the corresponding area, and scenario information for specifying a scenario in the area. In this case, the existence player information is constituted from a list of player character IDs, for example.

Figure 3:
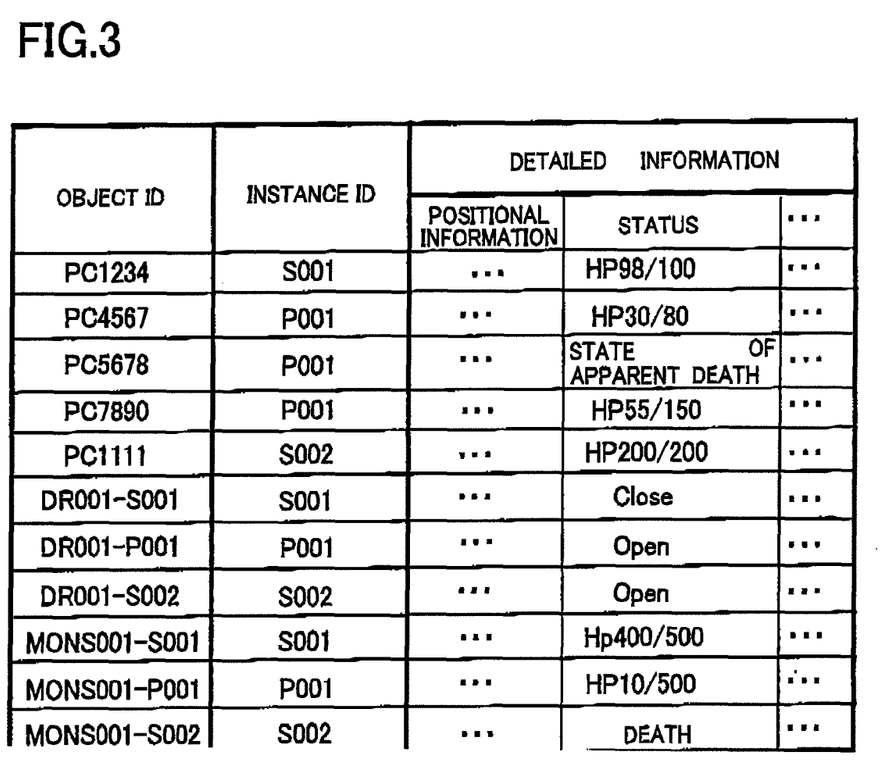
FIG. 3 is an explanatory drawing that shows an example of instance information.

As shown in FIG. 3, for example, the instance information is information in which an object ID for specifying each object (such as a player character, an enemy character, and a door) corresponds to an instance ID for uniquely specifying each instance and detailed information of each character (such as positional information and a status). The characters that correspond to the same instance ID can share all of the object data even in a non-shared area. For this reason, such characters can act in connection with each other. More specifically, with respect to a private area realized by an instance ID "S001", a player character of an object ID "PC1234", a door of an object ID "DR001" and an enemy character of an object ID "MONS001" are displayed in a non-shared area as the same time. These characters can act in the non-shared area in connection with each other.

According to the instance information, the status of a character, such as an enemy character, a door and an item, used as a clear necessary event allows a stage of progress for every private area to be specified. For example, in the case where the clear necessary event includes an event in which a player character wins a boss character with a battle, progress information can be specified from a position and/or a remaining HP of the boss character (which are specified by the status information). Further, for example, in the case where the clear necessary event includes discovery of a predetermined item, progress information can be specified from a position of the predetermined item and/or a status of discovered or not discovered thereof (which are specified by the status information).

In this regard, in the example shown in FIG. 3, the "object name (for example, DR001 for a "door") and instance ID" is applied to an object other than a player character with an ID supply rule for an object ID. The provision of such an ID supply rule can prevent an instance ID from being redundantly supplied by mistake. In addition, since it is easy to confirm that the object is an object other than a player character as well as the corresponding instance ID, check and/or maintenance can be facilitated even in the unlikely event that any defect occurs in the online video game.

Next, an operation of the online video game control server 10 according to the present embodiment will be described.

Figure 4:
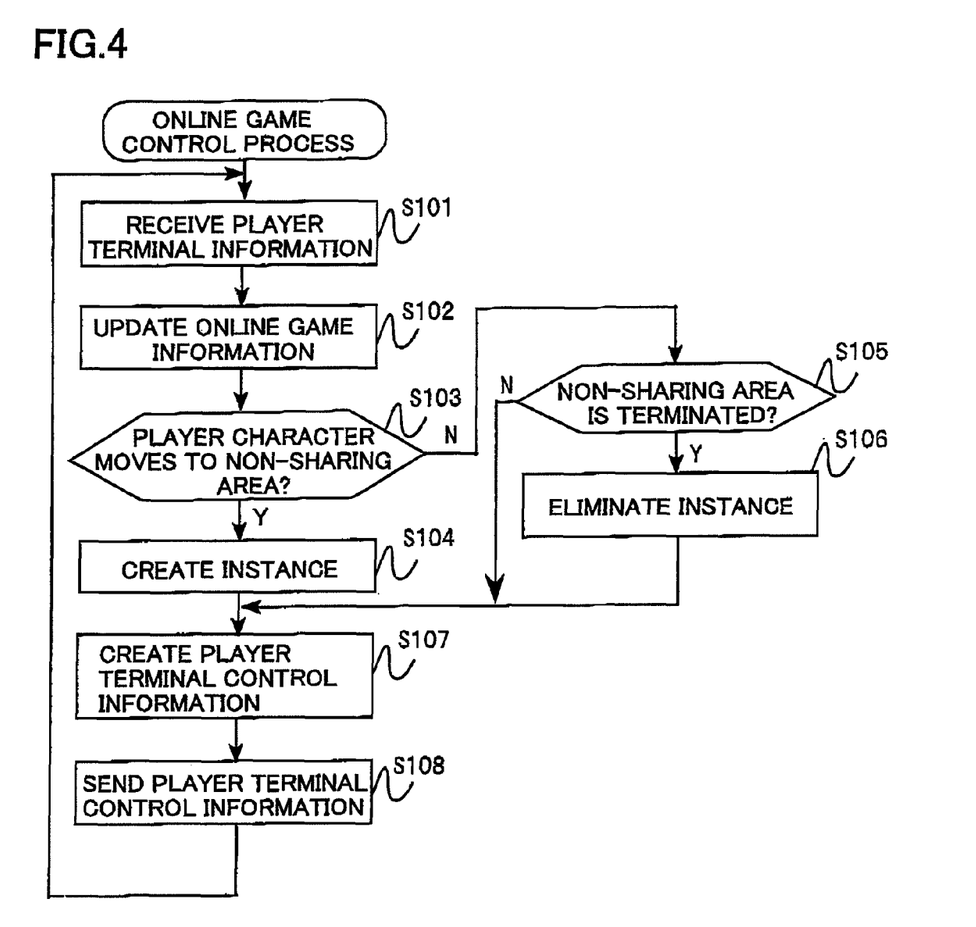
FIG. 4 is a flowchart that illustrates an example of an online game control process.

FIG. 4 is a flowchart that illustrates an example of an online game control process in the online video game control server 10 according to the present embodiment. Here, in order to simplify the explanation of the online game control process, a player P plays an online video game by operating a player terminal 21 of the player P. Further, in order to explain a process for delivering the online video game to the player terminal 21, explanation for any process other than the processes regarding the present invention, in particular, may be omitted.

In the online game control process, the control section 11 receives player terminal information from the player terminal 21 (Step S101). In this case, the player terminal information includes various kinds of information required to receive a notification from the player terminal 21 for controlling the online video game, such as an area and clear of a stage in the online video game in which the player character in the player terminal 21 proceeds, start or end of an event, a request to make a conversation with other player character, a reply to a request to make a conversation from other player character.

When the player terminal information is received, the control section 11 updates online game information in accordance with the received player terminal information (Step S102). Namely, the control section 11 causes the player terminal 21 to update progress information of the online video game.

In the case where a player character operated by the player P is moved into a non-shared area ("Yes" at Step S103), the control section 11 creates instance information on the player character (Step S104). At Step S104, the control section 11 first detects an object ID of the player character P that is moved into the non-shared area (in this embodiment, a player character ID operated by the player P). The control section 11 then refers to player information using the detected player character ID to confirm whether the player character is acting independently or belongs to a party. In the case where it is confirmed that the player character belongs to the party, the control section 11 confirms whether any other player character that is a member of the party has already been moved in the non-shared area or not. The control section 11 determines to use the instance ID corresponding to the other player character that has already been moved in the non-shared area in the case where it is confirmed that the other player character has already been moved in the non-shared area. On the other hand, the control section 11 issues a new instance ID in the case where it is confirmed that the other player character has not been moved in the non-shared area yet. The control section 11 then refers to positional information (or a progress status) of each player character at Step S102, for example. The control section 11 in turn adds information of an object required to create a new instance (for example, an object such as a door, or a boss character) to a table for instance information in accordance with the positional information (or the progress status) of the player character.

As described above, since the object required to create the instance is in turn added in accordance with the progress status of the player character, it is no need to create an instance for instance data unnecessary for the time being (for an object that does not become necessary any more).

In this regard, in the present embodiment, the control section 11 executes a rendering of background data and the like in response to the progress (or the positional information) of the player character at Step S102. Subsequently, in the case where the positional information of the player character is in a non-shared area, the control section 11 determines whether or not the object is data required to create instance information when reading the object data on the object. Further, in the case where it is determined that the object is to be required to create instance information, the control section 11 adds the instance information of the object to a non-shared area information table.

On the other hand, in the case where the player character operated by the player P clears the non-shared area (that is, it clears all of the clear necessary events) ("Yes" at Step S105), the control section 11 erases the instance information including the instance ID to which the player character belongs (in this embodiment, the instance ID of the player P) (Step S106).

The control section 11 then creates player terminal control information with reference to the portion corresponding to the player terminal 21 in the online game information (Step S107), and sends the created player terminal control information to the player terminal 21 via the communication network 30 (Step S108).

The online video game control server 10 repeatedly executes the processes at Steps S101 to S108 described above to control the video game executed in the player terminal 21. Further, the online video game control server 10 repeatedly executes the processes at Steps S101 to S108 described above for each of the player terminals 21 to 2N to control the video game executed in each of the player terminals 21 to 2N.

Figure 5:
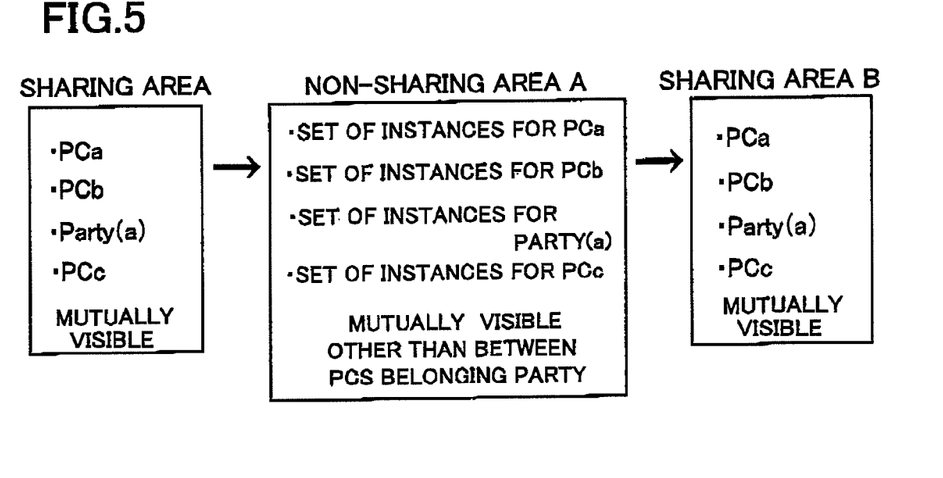
FIG. 5 is an explanatory drawing that shows a concept of an area transition.
Figure 6:
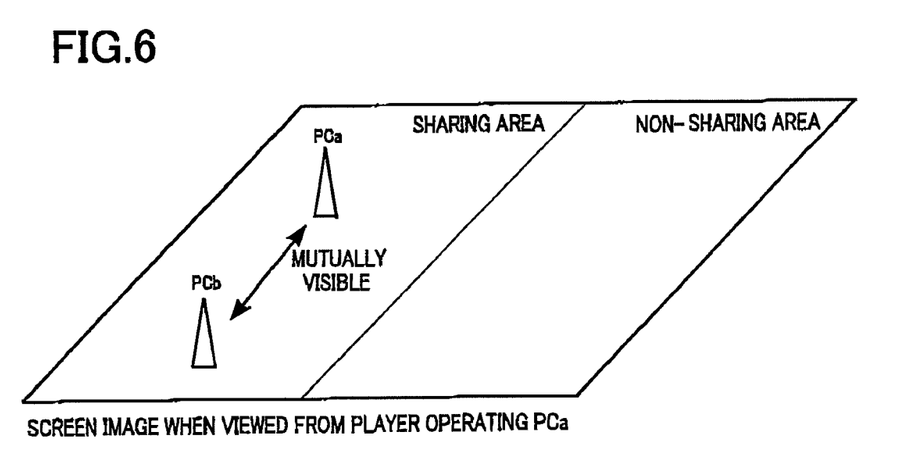
FIG. 6 is an explanatory drawing that shows a concept of an area transition.
Figure 7:
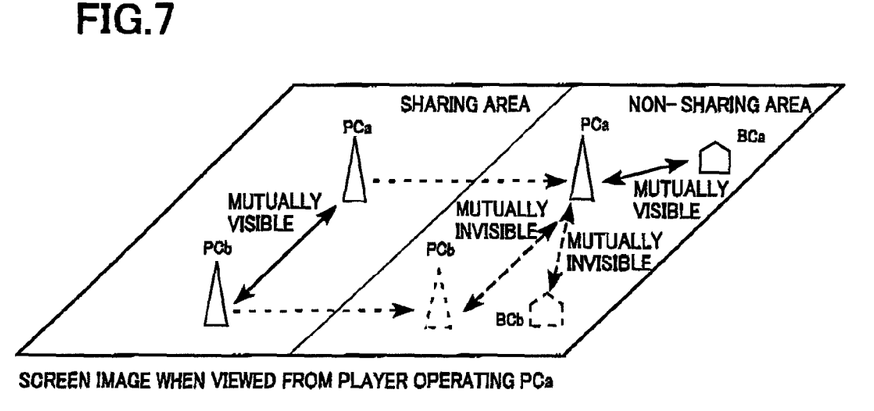
FIG. 7 is an explanatory drawing that shows a concept of an area transition.

FIGS. 5 to 7 are explanatory drawings for explaining a concept of the private area used in the present embodiment. Here, the online video game proceeds in order of a shared area A, a non-shared area A, and a shared area B. Further, in this case, the example in which player characters PCa to PCf act in these areas in response to operations from player terminals 21 to 26, respectively, will be described. In this regard, each of the player characters PCa to PCc acts independently, and the player characters PCd to PCf constitute one party (that is, a party (a)) to act as a party.

The player characters PCa to PCf first exist in the shared area A. Each of the player characters PCa to PCc and the party (a) including the player characters PCd to PCf terminates the shared area by an action of each of the player characters PCa to PCc and the party (a) or cooperate work of some player characters (indifferent to inside or outside a party), and then the player characters PCa to PCf enter the non-shared area A. In this case, when entering the non-shared area A, instance information is created for each of the player characters PCa to PCc and the party (a).

For example, as the scene shifts from the condition shown in FIG. 6 to the condition shown in FIG. 7, the control section 11 detects the player characters PCa and PCb get across a border line between the shared area A and the non-shared area. At this time, the control section 11 determines whether the player characters PCa and PCb act independently or as a party. In the case where it is determined that the player characters PCa and PCb act independently, the control section 11 creates instance information corresponding to each of the player characters PCa and PCb that enter the non-shared area A, and breaks communication between other player terminals including the player terminals 21 and 22 for respectively operating the player characters PCa and PCb existing in the non-shared area A. When the communication is broken, the state is shifted to the condition shown in FIG. 7, for example. At the same time as entering the non-shared area A, in a display screen delivered to the player operating the player character PCa (that is, the display screen of the player terminal 21), the player character PCa operated by oneself, an enemy character (such as a boss character) BCa as a clear necessary event, and the like are displayed, while the player character PCb and an enemy character (such as a boss character) BCb as a clear necessary event for the player character PCb are not displayed. Thus, the player characters PCa and PCb are respectively displayed in the player terminals 21 and 22 of the players operating the player characters PCa and PCb so that each of the player characters PCa and PCb moves in the non-shared area A independently and experiences all of the clear necessary events prepared in the non-shared area A.

On the other hand, in the case where the online video game program detects a plurality of player characters constituting a party and acting together when the party enters the non-shared area A, the control section 11 first recognizes the ID of each of the player characters in the party, and executes a process to maintain the communication in the party. The control section 11 then creates an instance corresponding to the party, and breaks the communication between the party and other player or party. As described above, the communication between the player characters in the party is maintained at this time. Thus, at the same time as entering the non-shared area A, in a display screen delivered to the player operating each of the player character PCd to PCf (that is, the display screen of the player terminal 24 to 26), the player character operated by oneself and the other player characters that are constitute members of the party are displayed, while the other belonging player characters (that is, player characters that do not belong to the party) are not displayed. Therefore, the player characters PCd to PCf are respectively displayed in the player terminals 24 to 26 of the players operating the player characters PCd to PCf so that only the player characters PCd to PCf constituting the party move in the non-shared area A and experience all of the clear necessary events prepared in the non-shared area A.

In the case where each of the player characters PCa to PC and the party (a) terminates all of the clear necessary events, the instance information prepared for each of them is erased. The player characters PCa to PCc and the party (a) then shift to the shared area B in turn.

When the player characters PCa to PCc and the party (a) enter the shared area B, the online video game control server 10 recognizes the situation as a trigger to search other player characters with which a communication state to the player characters PCa to FCc and the party (a) is to be established. The online video game control server 10 then starts to communicate with the searched player characters so as to become visible mutually.

Figure 8:
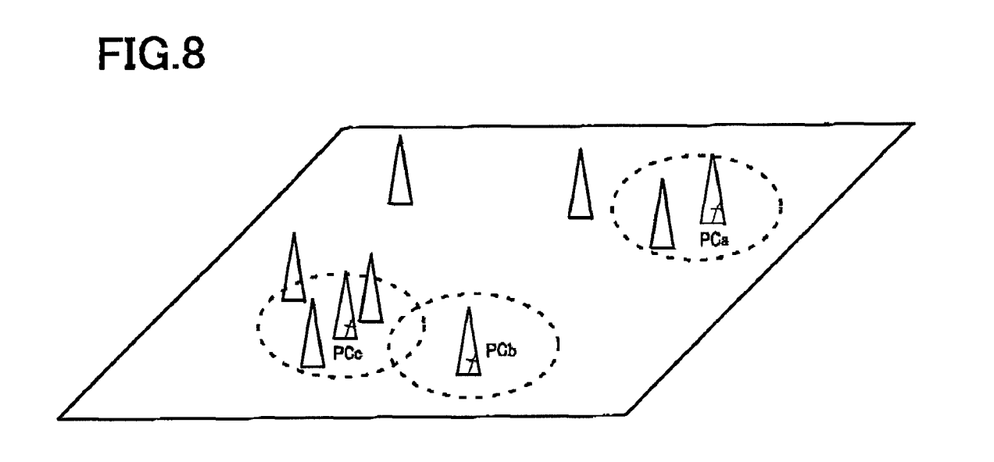
FIG. 8 is an explanatory drawing for explaining a method of searching a player character that is a target to communicate.

More specifically, in the present embodiment, as shown in FIG. 8, the online video game control server 10 specifies the position of each of the player characters PCa to PCc on the virtual space (virtual map) in the online video game; searches other player character(s) existing in a predetermined range from the specified position of each of the player characters PCa to PCc; and starts to communicate with the player terminal(s) for operating the other player character(s) thus searched. Thus, the other player character(s) existing in the predetermined range is displayed on the screen of his or her own player terminal so that the other player character and his or her own player character moves in the same area together.

As explained above, in the embodiment described above, the online video game control server 10 is constructed as follows. Namely, a shared area, in which both one player character whose action is controlled by operations from the player terminal and other player characters whose actions are respectively controlled by operations from other player terminals than the player terminal are allowed to exist together and the online video game can proceed while the one player character and the other player characters share various kinds of data on the shared area, and an unshared area, in which the video game proceeds for the one player character independently, while the one player character and other belonging player characters that are player characters other than the one player character and the other player character belonging to a party to which the one player character belongs cannot share any information, are provided in the game area. The online video game control server 10 controls the progress of the online video game on the basis of the game information stored in the online game information memory 15 for storing the game information on the online video game including the player information on the player characters, which includes player character progress information capable of specifying a stage of progress of the video game for each of the player characters, and the area information on the game area of the online video game. When the one player character moves to the unshared area, the online video game control server 10 creates instance information including area specifying information capable of specifying the unshared area, character identification information capable of identifying the one player character and instance creating necessary object information (for example, information such as the position of the corresponding object and the status thereof) used to supply an instance creating necessary object (for example, an object such as a boss character required to be struck down, an item required to acquire, and a door influencing on a display screen of a player terminal for a player operating other belonging player character) that the one player character cannot share with the other belonging player characters in the process that the one player character moves in the unshared area. In addition, the online video game control server 10 breaks communication between the one player character and the other belonging player character (that is, the server 10 breaks mutual communication with the other belonging player character by creating the instance information and establishes a private area) to update the instance information whenever the progress state of the instance creating necessary object changes due to the action of the one player character. Therefore, it is possible to realize a non-shared area equivalent to a private area in the state where the increasing amount of a server resource is suppressed, and this makes it possible to reduce the processing load of the online video game control server 10 for providing an online game as much as possible.

Namely, the online video game control server 10 creates the instance information including the instance creating necessary object information on the object required for the progress stage of the non-shared area (that is, instance creating necessary object), but other objects not required to create the instance in the progress stage of the non-shared area are not included in the instance information. Thus, compared with the case all of the area information on the non-shared area is simply created for the number of player characters or parties, it is possible to reduce increasing amount of the server resource even when the number of player characters or parties existing in the non-shared area is increased. Therefore, this makes it possible to supply each of the player characters existing in the non-shared area with the effect similar to that in the case of copying all of the non-shared area information and creating the private area.

Further, in the embodiment described above, the online video game control server 10 is constructed so as to erase the instance information for the one player character when the one player character moves from the unshared area to the shared area (that is, when the one player character exits from the non-shared area. Thus, it is possible to erase unnecessary data in turn, and this makes it possible to reduce the required capacity of the database (that is, the online game information memory 15).

Moreover, in the embodiment described above, the online video game control server 10 is constructed so that the instance creating necessary object information is object data that the one player character cannot share with the other player character, and includes specific non-player character data such as specific enemy character data. Thus, for example, each of all of the player characters and/or parties can execute a battle with the specific enemy character (for example, a boss character). Therefore, this makes it possible to supply each of the player characters existing in the non-shared area with the effect similar to that in the case of copying all of the non-shared area information and creating the private area.

In this regard, although one example of the video game control for the RPG has been explained in the embodiment described above, there is no wonder that the technique of the present invention can be applied to similar video games such as a gun action RPG. In addition, the technique of the present invention can also be applied to other kinds of video games appropriately, as will be readily apparent to those skilled in the art, without departing from the scope of spirit of the present invention.

The present invention can be applied to an online video game control server and the like that controls progress of a video game played in a player terminal in response to an operation by a player. Therefore, the present invention is useful.

What is claimed is:

1. An online video game control server that controls progress of a video game via a communication network, the video game being played in a player terminal, the player terminal being operated by a player, the online video game control server comprising:

a game information storage database that stores game information on the video game, the game information being utilized to control the progress of the video game, the game information including player information on player characters and area information on at least one game area of the video game, the player information including player character progress information specifying a stage of progress of the video game for each of the player characters, a shared area and an unshared area being provided in the game area, wherein, in the shared area, both a first player character whose action is controlled by operations from the player terminal and other player characters whose actions are respectively controlled by operations from player terminals other than the player terminal exist together, and the video game proceeds while the first player character and the other player characters share various kinds of data in the shared area and, in the unshared area, the video game for the first player character proceeds independently or proceeds while sharing information with the other player characters which belong to a first party to which the first player character belongs, while the first player character and other belonging player characters belonging to parties other than the first party cannot share any information, the other belonging player characters being player characters other than the first player character and the other player characters belonging to the first party to which the first player character belongs;

a controller that controls the progress of the video game based on the game information, and an instance information storage that stores an instance information table specifying instance information for the first player character that is prepared when the first player character moves from the shared area to the unshared area, wherein the area information includes player character specific information specifies the player character, the player character existing in a game area of the at least one game area, the game area including the shared area and the unshared area, wherein when the first player character moves from the shared area to the unshared area, the controller creates the instance information including area specifying information that specifies the unshared area, character identification information that identifies the first player character, and unshared object information with which information on a position of an unshared object and a status of the unshared object is associated, the unshared object information is at least one necessary object needed in a process with which the unshared area is associated, the unshared object information supplying the unshared object that the first player character cannot share with other belonging player characters, wherein the instance information, which specifies the at least one necessary object needed in the process with which the unshared area is associated, is erased when the at least one necessary object is cleared by the first player character, and the unshared object information being used to supply the unshared object that the first player character cannot share with the other belonging player characters, the controller storing the instance information in the instance information table and breaking communication between the first player character and the other belonging player characters, and wherein the controller updates the instance information whenever at least one of the position and the status of the unshared object changes due to an action of the first player character.

2. The online video game control server according to claim 1, wherein the controller erases the instance information for the first player character when the first player character moves from the unshared area to the shared area.

3. The online video game control server according to claim 2, wherein the unshared object includes at least one object among a boss character to be struck down, an item to acquire, and a door influencing a display screen of a player terminal for a player operating one of the other belonging player characters in the unshared area.

4. The online video game control server according to claim 2, wherein the instance information includes an instance ID that uniquely specifies each instance information issued by the controller when the instance information is made, and wherein the controller additionally associates, to the instance information table, the unshared object information which is used to offer the unshared object newly needed in the process to which the unshared area progresses, based on one of the position of the first player character in the unshared area and a progress report with a corresponding instance ID.

5. The online video game control server according to claim 3, wherein the instance information includes an instance ID that uniquely specifies each instance information issued by the controller when the instance information is made, and wherein the controller confirms whether the player character moves in an independent course of action or belongs to the first party with reference to the player information using character identification information detected to specify the first player character when the first player character moves to the unshared area, when the first player character belongs to the first party, the controller confirms whether the other player characters which belong to the first party to which to the first player character belongs has moved to the unshared area, the controller uses the instance ID which specifies character information for the other player character characters which have moved to the unshared area, when the other belonging characters have moved to the unshared area, and the controller issues a new instance ID and makes new instance information when the first player character does not belong to the first party or the first player character has not moved to the unshared area.

6. The online video game control server according to claim 1, wherein the unshared object includes at least one object among a boss character to be struck down, an item to acquire, and a door influencing a display screen of a player terminal for a player operating one of the other belonging player characters in the unshared area.

7. The online video game control server according to claim 6, wherein the instance information includes an instance ID that uniquely specifies each instance information issued by the controller when the instance information is made, and wherein the controller additionally associates, to the instance information table, the unshared object information which is used to offer the unshared object newly needed in the process to which the unshared area progresses, based on one of the position of the first player character in the unshared area and a progress report with a corresponding instance ID.

8. The online video game control server according to claim 6, wherein the instance information includes an instance ID that uniquely specifies each instance information issued by the controller when the instance information is made, and wherein the controller confirms whether the player character moves in an independent course of action or belongs to the first party with reference to the player information using character identification information detected to specify the first player character when the first player character moves to the unshared area, when the first player character belongs to the first party, the controller confirms whether the other player characters which belong to the first party to which to the first player character belongs has moved to the unshared area, the controller uses the instance ID which specifies character information for the other player character characters which have moved to the unshared area, when the other belonging characters have moved to the unshared area, and the controller issues a new instance ID and makes new instance information when the first player character does not belong to the first party or the first player character has not moved to the unshared area.

9. The online video game control server according to claim 1, wherein the instance information includes an instance ID that uniquely specifies each instance information issued by the controller when the instance information is made, and wherein the controller additionally associates, to the instance information table, the unshared object information which is used to offer the unshared object newly needed in the process to which the unshared area progresses, based on one of the position of the first player character in the unshared area and a progress report with a corresponding instance ID.

10. An online video game control server that controls progress of a video game via a communication network, the video game being played in a player terminal, the player terminal being operated by a player, the online video game control server comprising:

a game information storage database that stores game information on the video game, the game information being utilized to control the progress of the video game, the game information including player information on player characters and area information on at least one game area of the video game, the player information including player character progress information specifying a stage of progress of the video game for each of the player characters, a shared area and an unshared area being provided in the game area, wherein, in the shared area, both a first player character whose action is controlled by operations from the player terminal and other player characters whose actions are respectively controlled by operations from player terminals other than the player terminal exist exists together, and the video game proceeds while the first player character and the other player characters share various kinds of data in the shared area and, in the unshared area, the video game for the first player character proceeds independently or proceeds while sharing information with the other player characters which belong to a first party to which the first player character belongs, while the first player character and other belonging player characters belonging to parties other than the first party cannot share any information, the other belonging player characters being player characters other than the first player character and the other player characters belonging to the first party to which the first player character belongs;

a controller that controls the progress of the video game based on the game information, and an instance information storage that stores an instance information table specifying instance information for the first player character that is prepared when the first player character moves from the shared area to the unshared area, wherein the area information includes player character specific information that specifies the player character, the player character existing in a game area of the at least one game area, the game area including the shared area and the unshared area, wherein when the first player character moves from the shared area to the unshared area, the controller creates the instance information including area specifying information that specifies the unshared area, character identification information that identifies the first player character and unshared object information with which information on a position of an unshared object and a status of the unshared object is associated, the unshared object information is at least one necessary object needed in a process with which the unshared area is associated, the unshared object information supplying the unshared object that the first player character cannot share with other belonging player characters, wherein the instance information, which specifies the at least one necessary object needed in the process with which the unshared area is associated, is erased when the at least one necessary object is cleared by the first player character, and the unshared object information being used to supply the unshared object that the first player character cannot share with the other belonging player characters, the controller storing the instance information in the instance information table and breaking communication between the first player character and the other belonging player characters, wherein the controller updates the instance information whenever at least one of the position and the status of the unshared object changes due to an action of the first player character, wherein the controller confirms whether the player character moves in an independent course of action or belongs to the first party with reference to the player information using character identification information detected to specify the first player character when the first player character moves to the unshared area, when the first player character belongs to the first party, the controller confirms whether the other player characters which belong to the first party to which to the first player character belongs has moved to the unshared area, the controller uses the instance ID which specifies character information for the other player characters which have moved to the unshared area, when the other belonging characters have moved to the unshared area, and the controller issues a new instance ID and makes new instance information when the first player character does not belong to the first party or the first player character has not moved to the unshared area.

11. An online video game control server that controls progress of a video game via a communication network, the video game being played in a player terminal, the player terminal being operated by a player, the online video game control server comprising:

a game information storage database that stores game information on the video game, the game information being utilized to control the progress of the video game, the game information including player information on player characters and area information on at least one game area of the video game, the player information including player character progress information specifying a stage of progress of the video game for each of the player characters, a shared area and an unshared area being provided in the game area, wherein, in the shared area, both a first player character whose action is controlled by operations from the player terminal and other player characters whose actions are respectively controlled by operations from player terminals other than the player terminal exist together, and the video game proceeds while the first player character and the other player characters share various kinds of data in the shared area and, in the unshared area, the video game for the first player character proceeds independently or proceeds while sharing information with the other player characters which belong to a first party to which the first player character belongs, while the first player character and other belonging player characters belonging to parties other than the first party cannot share any information, the other belonging player characters being player characters other than the first player character and the other player characters belonging to the first party to which the first player character belongs;

a controller that controls the progress of the video game based on the game information, and an instance information storage that stores an instance information table specifying instance information for the first player character that is prepared when the first player character moves from the shared area to the unshared area, wherein the area information includes player character specific information that specifies the player character, the player character existing in a game area of the at least one game area, the game area including the shared area and the unshared area, wherein when the first player character moves from the shared area to the unshared area, the controller creates the instance information including area specifying information that specifies the unshared area, character identification information that identifies the first player character and unshared object information with which information on a position of an unshared object and a status of the unshared object is associated, the unshared object information is at least one necessary object needed in a process with which the unshared area is associated, the unshared object information supplying the unshared object that the first player character cannot share with other belonging player characters, wherein the instance information, which specifies the at least one necessary object needed in the process with which the unshared area is associated, is erased when the at least one necessary object is cleared by the first player character, and the unshared object information being used to supply the unshared object that the first player character cannot share with the other belonging player characters, the controller storing the instance information in the instance information table and breaking communication between the first player character and the other belonging player characters, wherein the controller updates the instance information whenever at least one of the position and the status of the unshared object changes due to an action of the first player character, wherein the controller erases the instance information for the first player character when the first player character moves from the unshared area to the shared area, wherein the controller confirms whether the player character moves in an independent course of action or belongs to the first party with reference to the player information using character identification information detected to specify the first player character when the first player character moves to the unshared area, when the first player character belongs to the first party, the controller confirms whether the other player characters which belong to the first party to which to the first player character belongs has moved to the unshared area, the controller uses the instance ID which specifies character information for the other player characters which have moved to the unshared area, when the other belonging characters have moved to the unshared area, and the controller issues a new instance ID and makes new instance information when the first player character does not belong to the first party or the first player character has not moved to the unshared area.

* * * * *